UNITED STATES PATENT OFFICE.

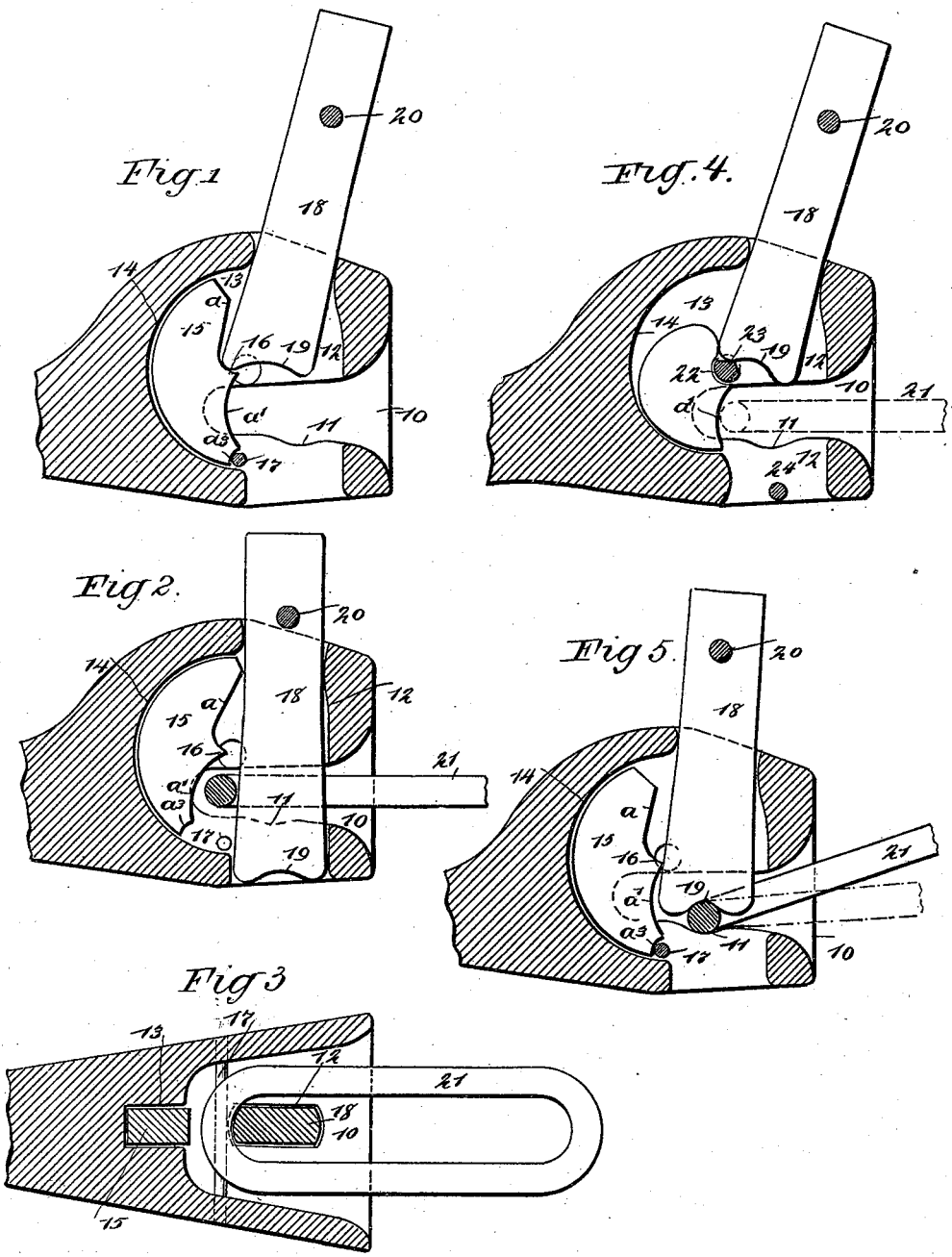

VALENTINE ERBACH, OF SCRANTON, PENNSYLVANIA.

CAR-COUPLING.

SPECIFICATION forming part of Letters Patent No. 496,251, dated April 25, 1893.

Application filed January 31, 1893. Serial No. 460,280. (No model.)

*To all whom it may concern:*

Be it known that I, VALENTINE ERBACH, of Scranton, in the county of Lackawanna and State of Pennsylvania, have invented a new and Improved Car-Coupler, of which the following is a full, clear, and exact description.

My invention relates to an improvement in car couplings, and it has for its object to provide a coupling which will be exceedingly simple, durable and economic in construction and to provide a means whereby a coupling pin may be held in an elevated position within the drawhead for the purpose of admitting a link, and whereby also when a link has entered the link chamber of the drawhead a gravity dog will be operated upon in such a manner as to trip the pin and cause it to be guided downward in the link.

Another feature of the invention consists in constructing the car coupler in but few parts, and providing a means whereby the coupling pin may be brought into such engagement with a link as to give to the link an upwardly inclined position, maintaining it in that position until the pin is purposely readjusted, or until a coupling has been effected.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a vertical section taken about centrally through the drawhead, in which the dog adapted to operate the link is purely of the gravity type, the coupling pin being illustrated as in position for coupling. Fig. 2 is a similar view, illustrating the coupling pin as in coupling engagement with the link. Fig. 3 is a horizontal section through the drawhead, with the link and pin in coupling position. Fig. 4 is a vertical section through the drawhead, illustrating the dog operating in connection with the pin as having guided or pivotal connection within the drawhead, the pin being in coupling position; and Fig. 5 is likewise a vertical section through the drawhead, the dog being of the same type as that shown in Figs. 1 and 2, but the coupling pin is shown in position for holding the link to couple with a high opposing coupler.

In carrying out the invention the link opening 10 in the drawhead is horizontally located, and is of the usual type; but preferably in the central portion of the lower wall of said opening a depression 11, is made. The link opening 10, crosses a pin opening 12, which opening extends from top to bottom of the drawhead, passing through the said upper and lower faces; and the pin opening 12, is in communication with a chamber 13, located likewise within the drawhead and back of the pin opening 12, the chamber 13, having also communication with the link opening 10. The rear wall of the chamber 13 is semi-circular, as shown at 14, in Figs. 1, 2 and 5; in fact the entire chamber is of segmental formation. The chamber 13 is adapted to carry a gravity dog 15, which is somewhat crescent or semicircular in shape, its convexed rear face being adapted to fit to the concaved rear wall of the chamber in which it is located.

The inner face of the gravity dog 15, is provided at or near its center with a spur 16; and the surface above and below this spur is concaved as shown at $a$ and $a'$, while the upper inner edge of the dog is somewhat cut away, and a cavity $a^3$ is produced in its lower forward end; and this cavity is adapted to receive a pin 17, the pin serving as shown in Figs. 1 and 2, to prevent the dog from leaving its chamber. The dog may be moved vertically or rocked within its chamber by the link coming in engagement with its lower concaved surface $a'$, while when the coupling pin is in position to receive a link, the pin at its lower rear edge rests upon the spur 16, as shown in Fig. 1. The lower edge of the coupling pin 18 is provided with a cavity 19, as is shown in all of the views; and the upper side walls of the pin opening 12 are so inclined that when the pin is elevated it will be compelled to take a diagonal position within the drawhead, extending diagonally across its opening 12 and into the chamber 13 in which the gravity dog is located. The pin is somewhat wedge-shaped, being of much greater width at its lower than at its upper end; thus when the pin is drawn upward until its lower end is practically wedged in the upper end of its opening 12, the cars may be shunted, or the drawhead may receive impact from an opposing drawhead, the latter carrying a link, without effecting a coupling. The lower end of the pin can not possibly be carried upward through the upper end of the pin opening, but the pin must be removed from the lower end of that opening, and the pin is prevented from dropping of itself out of the drawhead by passing through the upper end of the pin a removable rod or bar 20, which when the pin is in its lower or coupling position rests upon the drawhead at the upper face thereof, as shown in Fig. 2. In this form of coupling, the pin being elevated and resting upon the dog 15, when the link of an opposing drawhead enters the link chamber 10, it will engage with the lower concaved forward surface $a'$ of the dog, and will force the dog to ride upward in its chamber; and as the dog is given its upward movement the pin 18, is thrown off from the spur 16 on the dog, and the pin will then gravitate downward and pass through the link, as shown in Fig. 2, in which view the link is designated as 21.

If in practice it is found desirable to couple with an opposing drawhead of greater height than the drawhead being manipulated, the link, after being entered in the link chamber 10, is so placed that its inner end will be located in the depression 11 in the floor of the said link opening; and by carrying the pin downward until its concaved lower surface 19 engages with the inner end of the link, the link will be inclined upward as shown in Fig. 5 and will be held in that position. When the link enters an opposing drawhead the shock caused by the impact of the drawheads or buffers will force the link rearward and the pin will drop down within the link.

In Fig. 4 I have illustrated a slight modification in the form of the pin supporting the trip dog, in which view the dog is made much smaller than the chamber 13 in which it is to operate, and the rear edge of the dog does not through its entire length engage with the rear wall of the chamber. This modified form of dog is provided with the lower forward concaved face $a'$ produced in the crescent form of dog, and immediately above this concaved surface a decided depression or cavity 22, is formed, adapted to engage with a pivot pin 23, the pin being removably placed in the drawhead and passing through it from side to side. The upper surface of the pivot pin is inclined from its center in direction of both sides; and when the coupling pin is in its coupling position it rests upon the upper inclined surface of the pivot pin 23, the upper forward edge of the dog being in engagement with the lower rear edge of the pin.

It will be observed that the moment the concaved surface $a'$ of the dog is engaged by a link entering the drawhead, its upward forward surface will, as the dog is forced upward and rearward upon its pivot, throw the pin from the pivot, and the pin will drop downward in the link.

In Fig. 4 also I have illustrated a pin 24, passing centrally across the lower end of the link chamber 12, which serves to limit the downward movement of the pin, and also prevents the possible escape of the dog. In the event any accident should happen to the drawhead beyond the possibility of repair, the dog may be taken out and the drawhead be used as an ordinary link and pin coupler.

Having thus described my invention, I claim as new and desire to secure by Letters Patent—

1. In a car coupler, the combination, with a flat gravity coupling pin, having a transverse concavity 19 in its lower end of a gravity combined locking and tripping dog located within the drawhead, said dog being adapted to be acted upon by a link entering the drawhead and having a bearing surface to receive the lower end of the pin, as and for the purpose set forth.

2. In a car coupler, the combination, with a drawhead provided with a pin opening, and a link opening crossing the pin opening, and having a depression 11 in its bottom the pin opening having inclined upper walls, to incline the pin inwardly at its lower end when raised the drawhead being likewise provided with a semi-circular chamber connecting with the link and pin openings, of a flat pin located within the pin opening provided across its lower end with a concavity 19 and adapted to fall by gravity, and a gravity combined locking and trip dog located within the said semi-circular chamber, the dog being provided with a cylindrical rear surface and a concaved front lower surface, and a bearing upon its front surface to receive the coupling pin, substantially as and for the purpose specified.

3. In a car coupler, the combination, with a drawhead provided with a rear semi-circular chamber, and a pin and a link opening connecting with the chamber and with each other, the upper end of the pin opening being inclined, of a coupling pin of essentially wedge shape at its lower end and provided with a depression in said end, means for limiting the downward movement of said pin, a gravity coupling and trip dog loosely located within the circular chamber, the rear edge of the dog being cylindrical and a portion of its forward face concaved, the forward face of the dog being likewise provided with a bearing to receive the lower end of the coupling pin, and means, substantially as shown and described, for maintaining the dog loosely within its chamber, as and for the purpose set forth.

VALENTINE ERBACH.

Witnesses:
D. J. JENKINS,
JOHN L. JENKINS.